(12) United States Patent
Kobayashi (10) Patent No.: US 7,024,372 B2
(45) Date of Patent: Apr. 4, 2006

(54) PERSONNEL VALUATION PROGRAM

(75) Inventor: Seiji Kobayashi, Kanagawa-ken (JP)

(73) Assignee: ETNA Corporation, Tokyo (JP)

( * ) Notice: Subject to any disclaimer, the term of this patent is extended or adjusted under 35 U.S.C. 154(b) by 639 days.

(21) Appl. No.: 09/801,717

(22) Filed: Mar. 9, 2001

(65) Prior Publication Data

US 2002/0128900 A1 Sep. 12, 2002

(51) Int. Cl.
*G06F 17/60* (2006.01)
(52) U.S. Cl. ....................................................... 705/11
(58) Field of Classification Search .................... 444/1; 705/7

See application file for complete search history.

(56) References Cited

U.S. PATENT DOCUMENTS

| | | | |
|---|---|---|---|
| 3,628,904 A * | 12/1971 | Canguilhem | 444/1 |
| 5,909,669 A * | 6/1999 | Havens | 705/11 |
| 5,956,692 A * | 9/1999 | Foley | 705/7 |
| 6,338,042 B1 * | 1/2002 | Paizis | 705/11 |

FOREIGN PATENT DOCUMENTS

JP 2000187685 A * 7/2000

OTHER PUBLICATIONS

"P & Q Review!" Getting started Guide; Jun., 1995.*
"The Refined" Performance Evaluation Monitoring System: Best of Both Worlds; Schick, Melvin E, Personnel Journal; Santa Monica; Jan. 1980.*
"P & Q Review!" Getting started Guide; Jun., 1995.*
"The Refined" Performance Evaluation Monitoring System: Best of Both Worlds; Schick, Melvin E, Personnel Journal; Santa Monica; Jan. 1980.*

* cited by examiner

*Primary Examiner*—Wynn W. Coggins
*Assistant Examiner*—R. E. Rhode, Jr.
(74) *Attorney, Agent, or Firm*—Wenderoth, Lind & Ponack, L.L.P.

(57) ABSTRACT

An effective personnel valuation program permits an improved appropriateness valuation result to be obtained by adjusting deviation of valuation by individual valuators from a standard. Valuators at posts able to perform appropriate valuation are set as reference data valuators. Initial valuation data produced by valuators in a valuator group other than the reference data valuators are adjusted such that its mean data is identical with the mean data of the valuation data produced by the reference data valuators with the mean data and the standard deviation of the valuation data by the reference data valuators as references. Also, standard deviation fluctuations of the valuation data are adjusted such that the standard deviation is identical with the standard deviation of the valuation data produced by the reference data valuators.

2 Claims, 7 Drawing Sheets

| DATA OF VALUATOR i | | | | | | | | | |
|---|---|---|---|---|---|---|---|---|---|
| VALUATION ITEM / VALUATEE / ITEM WEIGHT | | a | b | c | | i | | | p |
| X_1 | Wx_1 | | | | | | | | |
| X_2 | Wx_2 | | | | | | | | |
| | | | | | | | | | |
| Y1_1 | Wy1_1 | | | | | | | | |
| Y1_2 | Wy1_2 | | | | | | | | |
| | | | | | | | | | |
| Y2_1 | Wy2_1 | | | | | | | | |
| Y2_2 | Wy2_2 | | | | | | | | |
| | | | | | | | | | |
| Y2_n | Wy2_n | | | | | | | | |
| TOTAL POINTS OF VALUATION | | | | | | | | | |

VALUATION RANK $R(X\_1, c)$

SELF-VARIATION DATA $T_i$

| VALUATEE'S COMMENT | | VALUATOR'S COMMENT |
|---|---|---|
| HEAD OFFICE GENERAL EMPLOYEE CLASS EMPLOYEE | 1, 2 | MUTUAL + SUPERVISOR |

| No. | Select Valuatee | Group Number Order, Age Order | | Select Valuator | Number of Persons Giving Valuation Answer | |
|---|---|---|---|---|---|---|
| | | | | | Self-Valuation + Valuation | |
| | | | | Valuator's Weight | Sole Self-Valuator | |
| Set Reference | | Department, Name | Group, Age | | Sole Valuator | No Valuator |
| 1 | ✓ | 6 Keiko Tajima | 7  58 | | 1 | 11.3 |
| 2 | ✓ | 5 Morinobu Tsukada | 7  55 | | 1 | 9.0 |
| 3 | ✓ | 4 Koutaro Kushihara | 7  52 | | 1 | 1.0 |
| 4 | ✓ | 3 Ryouji Koike | 7  49 | | 1 | 8.5 |
| 5 | ✓ | 4 Tadahiko Matsudaira | 7  49 | | 1 | 3.4 |
| 6 | ✓ | 5 Tyuji Ninomiya | 7  48 | | 1 | 7.4 |
| 7 | ✓ | 5 Joji Kikuta | 7  47 | | 1 | 2.6 |
| 8 | ✓ | 5 Junichi Yoshizawa | 7  46 | | 1 | 9.0 |
| 9 | ✓ | 4 Yasuhiko Sasaki | 7  45 | | 1 | 7.8 |
| 10 | ✓ | 5 Minoru Sugahara | 7  39 | | 1 | 9.0 |
| 11 | ✓ | 3 Nobuo Ishikawa | 7  36 | | 1 | 5.0 |
| 12 | ✓ | 5 Eiko Shiraishi | 7  32 | | 1 | 8.6 |
| 13 | ✓ | 4 Naoto Kishikawa | 7  32 | | 1 | 1.8 |
| 14 | ✓ | 5 Norito Nanbara | 7  32 | | 1 | 7.6 |
| 15 | ✓ | 4 Mayumi Utiyama | 7  31 | | 1 | |
| 16 | ✓ | 3 Hiroshi Nojima | 7  31 | | 1 | 5.0 |
| 17 | ✓ | 3 Hidehiko Ichimura | 7  31 | | 1 | 9.0 |
| 18 | ✓ | 3 Yoshihisa Sofue | 7  29 | | 1 | |
| 19 | ✓ | 7 Toshiko Kijima | 8  41 | | 1 | 2.0 |
| 20 | ✓ | 4 Mitsuo Shoji | 8  40 | | 1 | 1.1 |
| 21 | ✓ | 4 Kiyoshi Sone | 8  40 | | 1 | 18.0 |
| 22 | ✓ | 4 Sumiko Endo | 8  39 | | 1 | 2.0 |
| 23 | ✓ | 4 Tadahiro Nakamura | 8  37 | | 1 | 1.0 |
| 24 | ✓ | 3 Koujiro Hashiguchi | 8  37 | | 1 | 10.3 |
| 25 | ✓ | 4 Mototika Chiku | 8  37 | | 1 | 2.0 |
| 26 | ✓ | 3 Kimio Hanawa | 8  36 | | 1 | 10.8 |
| 27 | ✓ | 7 Yasuo Watanabe | 8  36 | | 1 | |
| 28 | ✓ | 10 Koutaro Teshima | 8  35 | | 1 | |
| 29 | | 2 Kimiharu Hirasawa | ● | | 4 | 28.0 |
| 30 | | 1 Kenjiro Shinoda | ● | | 4 | 28.0 |
| 31 | | 1 Jiro Noguchi | ● | | 4 | 28.0 |
| 32 | | 6 Keiji Tezuka | 2 ● | | 3 | 24.3 |
| 33 | | 5 Tokuji Kanamori | 2 ● | | 3 | 10.9 |
| 34 | | 7 Eizo Nakanishi | 2 ● | | 3 | 21.2 |
| 35 | | 5 Mariko Ishimaru | 3 ● | | 2 | 8.8 |
| 36 | | 3 Shizuo Kunugi | 3 ● | | 2 | 14.0 |
| 37 | | 6 Takasuke Shimojo | 3 ● | | 2 | 14.0 |
| 38 | | 5 Kinichi Kainuma | 3 ● | | 2 | 13.0 |
| 39 | | 5 Ryouichi Matsumoto | 3 ● | | 2 | 12.0 |
| 40 | | 2 Masahisa Sasahara | 4 ● | | 2 | 26.9 |
| 41 | | 7 Kazumi Kishi | 4 ● | | 2 | 25.3 |
| 42 | | 4 Toru Kawamura | 4 ● | | 2 | 11.0 |
| 43 | | 4 Tomohiro Kushihara | 5 ● | | 2 | 14.0 |
| 44 | | 3 Kensuke Machida | 5 ● | | 2 | 8.0 |
| 45 | | 3 Syunsuke Futami | 5 ● | | 2 | 6.0 |

PERSONNEL VALUATION PROGRAM

BACKGROUND OF THE INVENTION

1. Field of the Invention

This invention relates to a personnel valuation program, which permits an improved appropriateness valuation result to be obtained in personnel valuation in any place of work, in which wages for labor are paid.

2. Prior Art

In organizations in which wages for labor are paid, it is required that the wages are appropriate in consideration of the contents and results of labor. The personnel valuation which determines the wages thus should be appropriate. As a method of obtaining improved appropriateness personnel valuation data, multisided valuation by a plurality of valuators is advocated.

SUMMARY OF THE INVENTION

Heretofore, however, multisided valuation data has been used only as check data against supervisor class valuators who are apt to do impartial valuation and data for demanding self-examination of such valuators. No method has been advocated for processing great quantities of such multisided valuation data so as to be utilized as determinant data of valuation leading to salary. Except for special work places where the price can be determined solely by numerical data, such as sales data, the personnel valuation inevitably leads to different valuation results with different valuators with different ways of valuation.

Accordingly, it is an object of the invention to provide a personnel valuation program, which permits the production of improved appropriate valuation data by making use of a great quantity of multisided valuation data produced by a plurality of valuators.

BRIEF DESCRIPTION OF THE DRAWINGS

FIG. 4 is a view showing a setting display example on the display for reference data valuator setting, valuatee setting and valuator setting according to the invention;

DETAILED DESCRIPTION OF THE PREFERRED EMBODIMENTS

Figure 1:
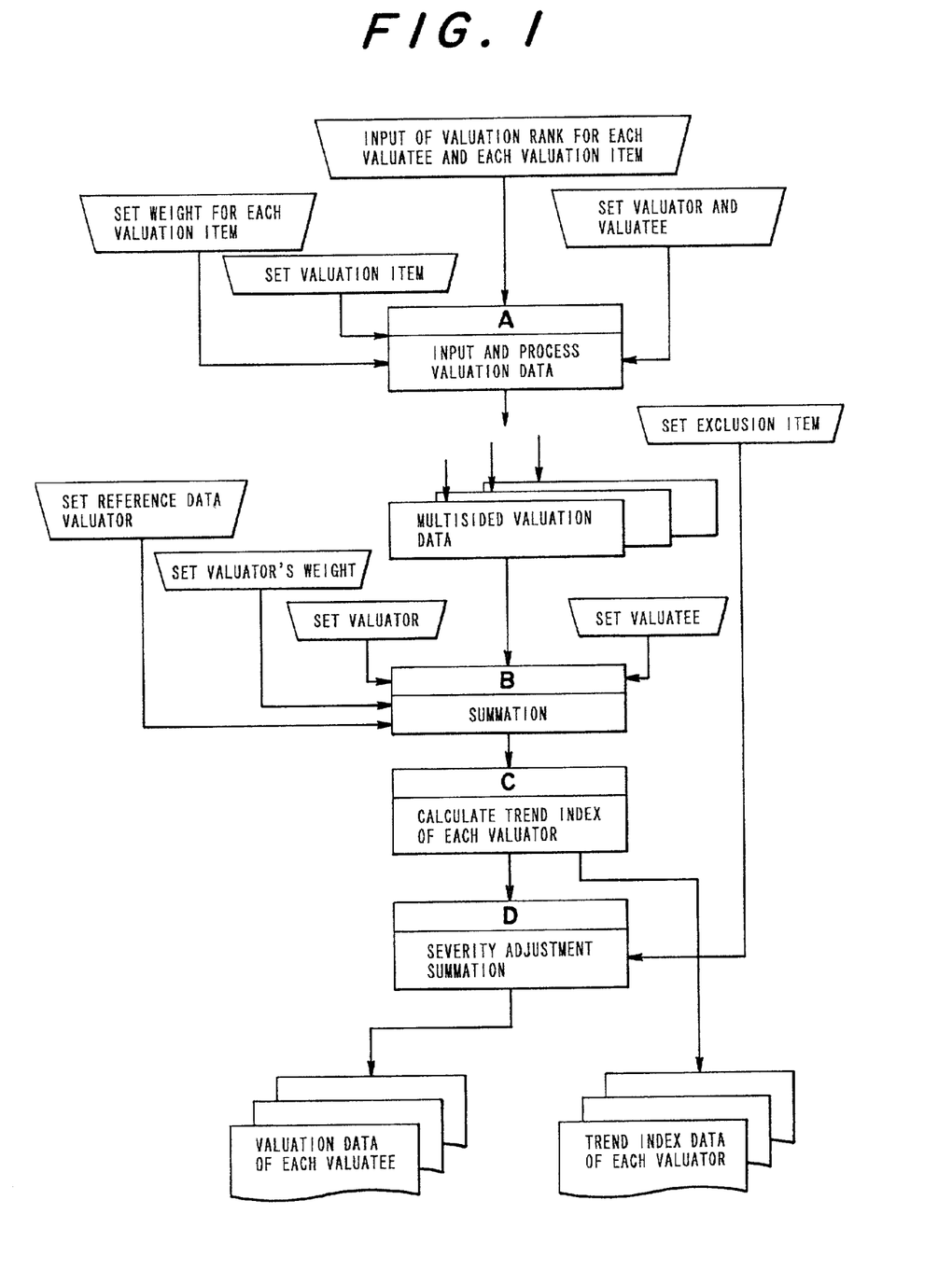
FIG. 1 is a block diagram summarizing the invention.

FIG. 1 shows the procedure of processing according to the personnel valuation program embodied on a computer readable medium for use with a computer according to the invention, for obtaining improved appropriateness valuation data from a great number of valuation data pieces obtained from multisided valuation.

Figure 2:
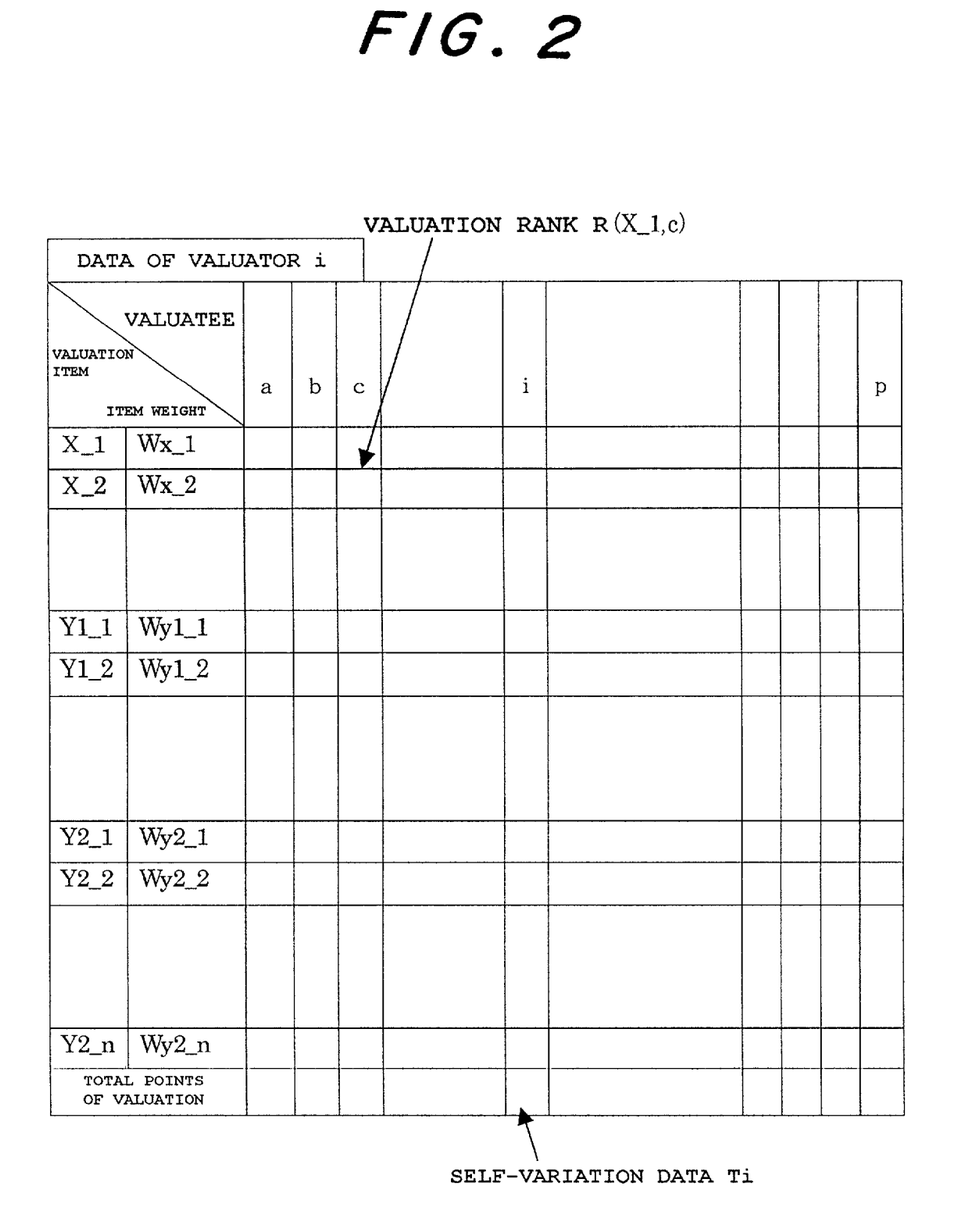
FIG. 2 is a view showing the organization format of multisided valuation data according to the invention.

In the first place, each valuator produces initial prior-to-adjustment valuation data by valuating valuatees on the preamble of a predetermined valuatee group, plural valuator groups corresponding to the valuatee group, a valuation item group and an item weight group corresponding to the item group, and inputting the valuation data thus obtained to a personal computer, in which the personnel valuation program according to the invention is installed, from a keyboard or like input means. This valuation data producing process is shown as process A, a valuation input process, in FIG. 1. FIG. 2 shows the data organization format of the valuation by each valuator.

Figure 3:
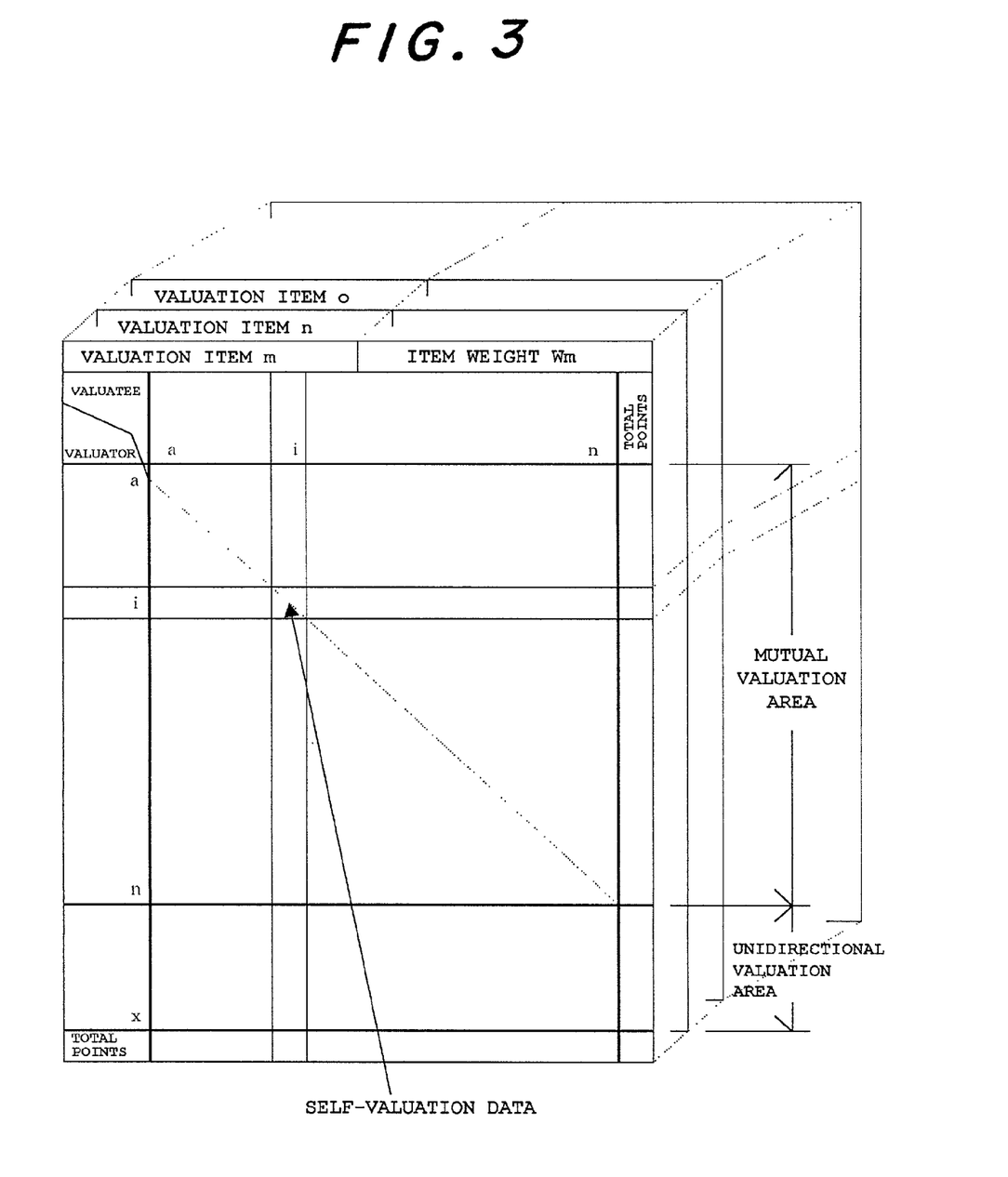
FIG. 3 is a view showing an image of valuation data according to the invention.

The multisided valuation data in FIG. 1 is the aggregation of the valuation data produced by the individual valuators. FIG. 3 shows an overall image of the valuation data. It is shown that the image includes data produced by the valuation of the valuators by the valuatees and vice versa.

In process B in FIG. 1, summation is done in the multisided valuation processing as to the contents of the individual items of valuation of each valuatee by a plurality of valuators. It is also shown that the following plurality of selective settings are possible in subsequent calculating processes.

FIG. 4 shows a setting display example on the display of a personal computer for the plurality of selective settings.

The valuatee setting which is done for the process B in FIG. 1 is provided for obtaining results of selecting a desired group of valuatees instead of all the valuatees with respect to the multisided valuation data.

The valuator selection permits production of such reference data as to what valuation trend a particular valuator group is in, or selection of a valuator or valuators on the basis of a valuation trend index value that is derived from the summation result.

The valuator's weight setting is the setting of a weight, by which data of a particular valuator among a plurality of valuators is to be multiplied. It is possible to provide different degrees of influence in the summation result according to the magnitude of the weight. In FIG. 4, numerical values 1 to 4 are shown as valuator's weights. For example, the weight of the value 1 is that of the director, the weight of the value 3 is that of the manager, and the weight of the value 2 is that of the chief. These weight values are inputted to the "valuator's weight" column in the setting display.

The reference data valuator setting is provided for the calculation, in the process B, of data serving as reference data in the next process C of an individual valuator's trend index calculation. Specifically, valuation data is used as reference data for the calculation. The valuator's weight of each selected valuator or valuators also fulfills the intended effect. When this setting is not done, the full summation result as selected by the valuatee setting, the valuatee setting and the valuator's weight setting, is used as reference data. In FIG. 4, it is shown that three valuators, whom a valuator's weight of 4 is set, are set as reference valuators. The setting is done by clicking the "No./Reference value" item on the setting display. It is possible to select only one or a plurality of reference valuators. The reference data valuators are selected for obtaining adequate personnel valuation data, and they may be at posts close to a post competent to make the final personnel decision or other persons.

The exclusion item setting is provided for excluding items, which do not depend on manual valuation, but have objective ranks determined on an objective basis, such as sales amount, sales quantity, net profit amount, production quantity, the production amount and qualification, in process D of the severity adjustment summation.

The reference data valuator setting, the valuatee setting and the valuator setting are selected or not by clicking the pertinent columns on the setting display in FIG. 4.

After the above selective settings, full processing is executed, in which data of the valuators and valuatee are summed up in the process B of the summation shown in FIG. 1. In the process C, the original data of the valuators and the summation result in the process B are compared by using the following equations.

Equation 1 given below is used for calculating the difference of the mean data of the reference data group (i.e., the valuation data by the reference data valuator group) from the mean data of result of valuation of a particular valuatee group by valuator H with respect to the same valuatee group.

$$AM(H)=AV(H)-AV(T) \quad \text{Equation 1}$$

where AM (H) is the severity (i.e., difference of the mean valuation of the reference data group from the mean valuation by the valuator H), H is the valuator number, V is the valuatee number, T is the reference data valuator group (or all selected valuators), AV (H) is the mean point (i.e., mean valuation of the valuator H), and AV (T) is the mean point (i.e., mean valuation of the reference data group).

Equation 2 is used for the calculation, as distribution degree Bu (H), of the ratio between standard deviation SV (H) from the result of valuation of the valuatee group by valuator H and standard deviation SV (T) of valuation data of the reference data valuator group.

$$Bu(H)=SV(H)/SV(T) \quad \text{Equation 2}$$

where Bu (H) is the distribution degree (i.e., standard deviation ratio), SV (H) is the standard deviation (from valuation by valuator H), and SV (T) is the standard deviation (of the reference data group).

Equation 3 is used by valuator H for calculating the difference KA (V, H) of the total points of the valuatee V by the valuator H from the mean total points.

$$KA(V,H)=TP(V,H)-AP(H) \quad \text{Equation 3}$$

where KA (V, H) is the deviation (concerning valuator V), TP (V, H) is the total points of valuation of the valuatee V by the valuator H, and AP (H) is the mean total points of valuation by valuator H.

Equation 4 is used for the calculation, from the above values, of severity CH (V, H) for severity adjusting the rank of valuation of the valuatee V by the valuator H.

$$CH(V,H)=AM(H)+KA(V,H)-KA(V,H)/Bu(H) \quad \text{Equation 4}$$

where CH (V, H) is the severity adjustment rank (V, H).

In the process C, which is executed by using the equations 1 to 4, if the valuation answer of each valuator for a valuatee has no answer for all the items, that valuatee is omitted.

For valuatees who have a non-answered item or items, the proportion of the weights of the answered items is used for conversion, and the answered item value is converted to full item answer value.

In process D in FIG. 1, calculation using the following equation 5 is done. Rank R (I) of the original data of item I is adjusted, before the summation, with severity adjustment rank CH (V, H) calculated in the process C.

$$Rc(I)=R(I)-CH(V,H) \quad \text{Equation 5}$$

where R (I) is the valuation rank of item I, and Rc (I) is the severity adjustment rank of item I.

Figure 5:
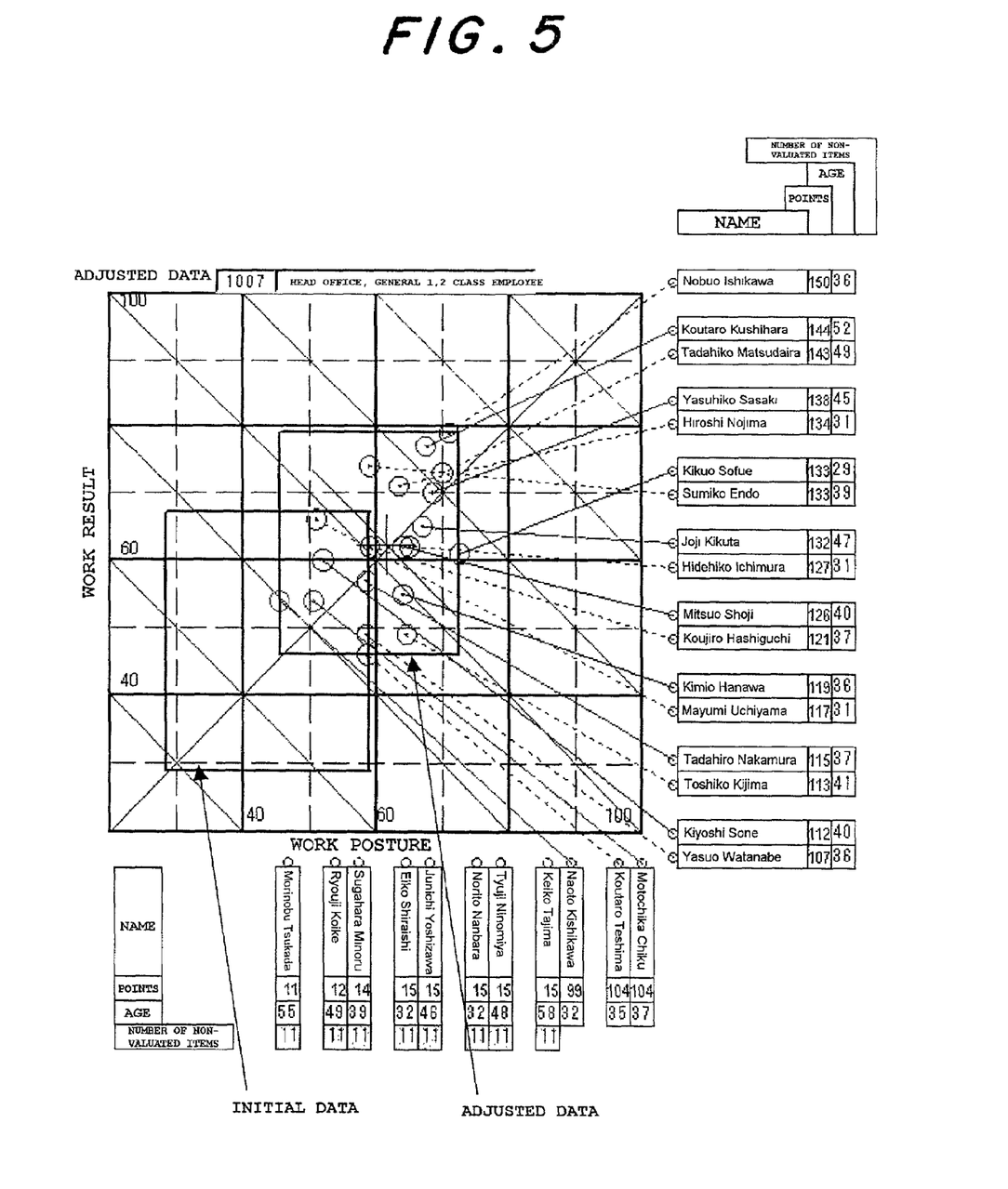
FIG. 5 is a view showing an example of display of initial valuation data concerning particular valuators and adjusted valuation data obtained by comparing the initial valuation data with data produced by reference value valuators according to the invention.

FIG. 5 shows an example of display adjusted valuation data obtained as a result of comparison, with respect to the severity and the standard deviation, of particular valuator's original valuation data and reference data valuator's data with respect to the severity and standard deviation. Of 28 valuatees, 20 valuatees are valuated. In the data comparison with respect to the severity and the standard deviation, the standard deviation of the original data was slightly greater than that of the 20 valuatee's reference data and also was slightly severe as a whole, and it is adjusted to obtain the adjusted data as shown.

Figure 6:
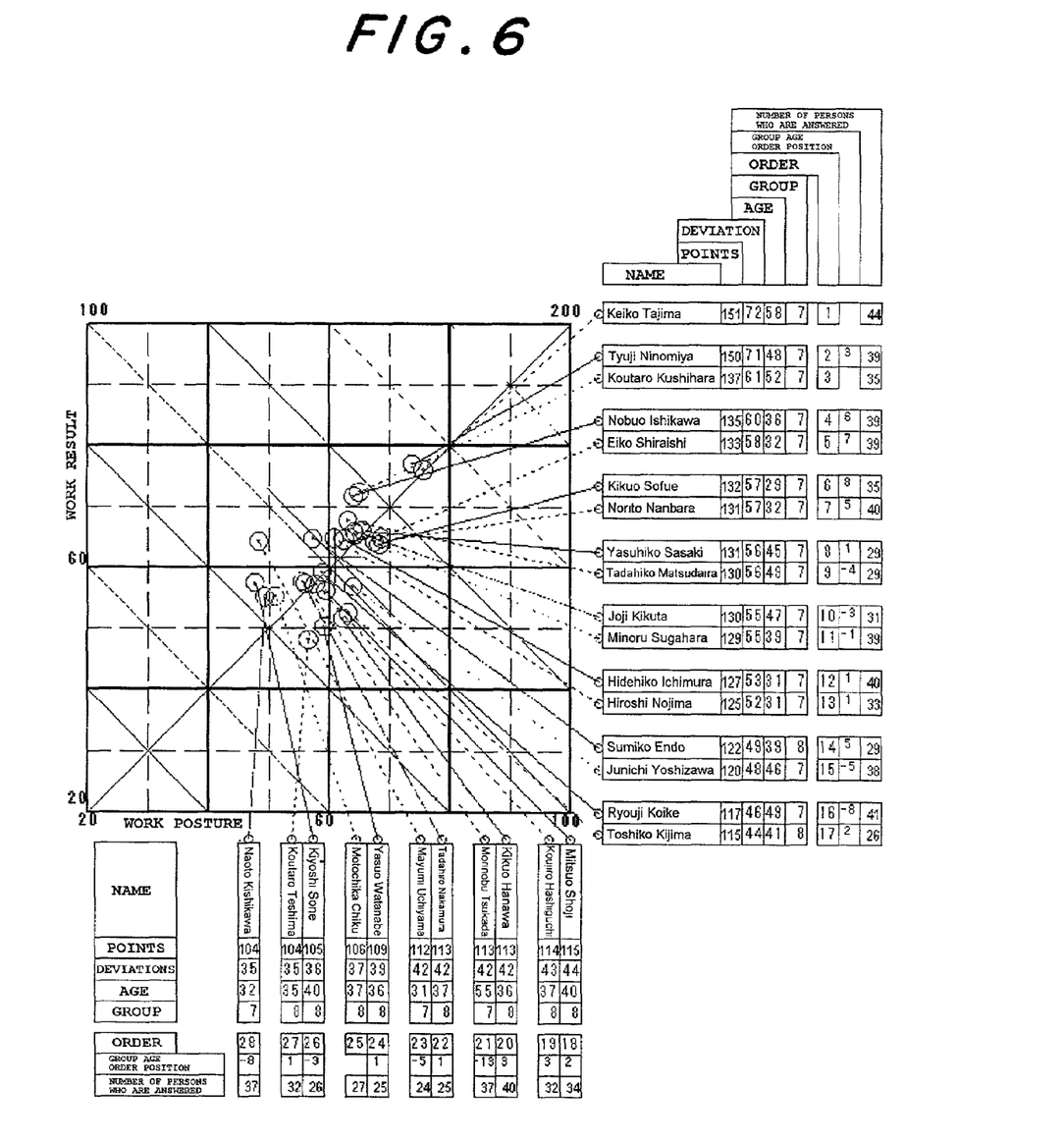
FIG. 6 is a view showing an example of display of the result of adjustment and summation of data produced by a plurality of valuators according to the invention.
Figure 7:
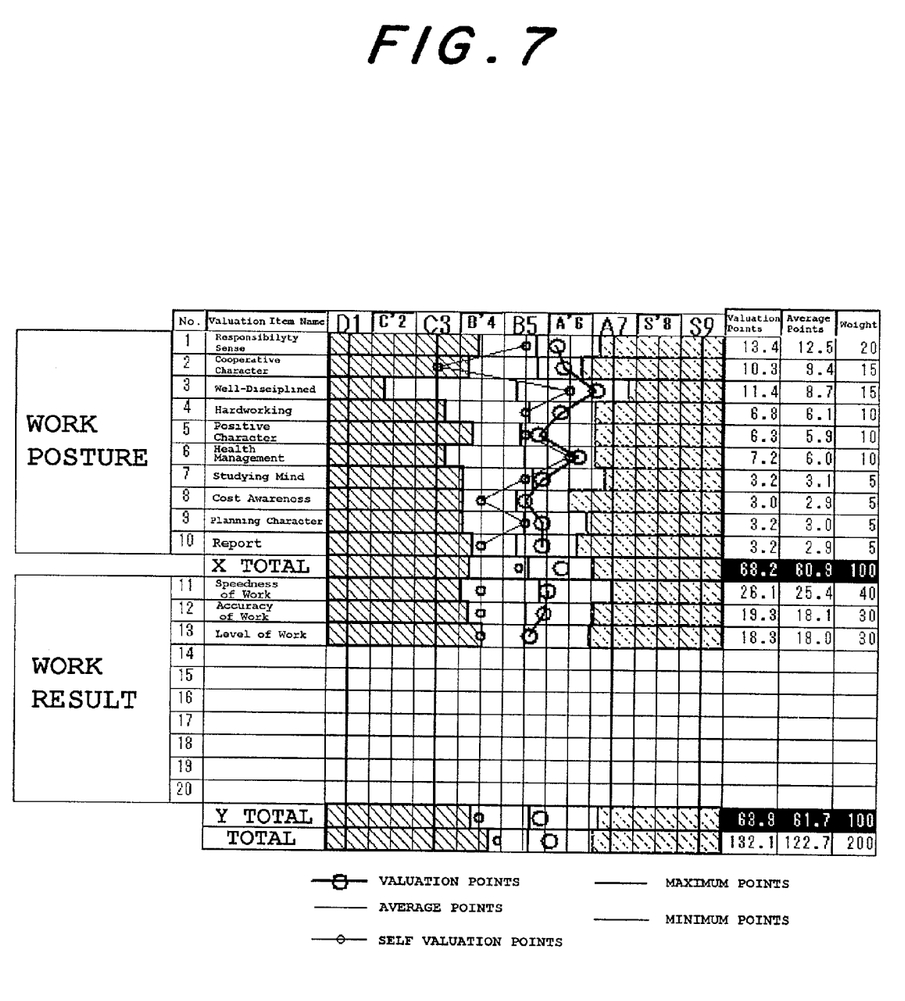
FIG. 7 is a view showing an example of calculation result data of individual valuatees according to the invention.

FIG. 6 shows an example of display of the result of summation of severity adjusted data obtained from data of valuation by a plurality of valuators. FIG. 7 shows an example of calculation result data for individual valuatees.

It will be seen that the personnel valuation program according to the invention can solve the problem in the prior art initial valuation adjusting means using mean data that, when the initial valuation data includes greatly deviated data, the mean data itself is greatly affected by the deviated data if the reference data for the adjustment is obtained by purely averaging the valuation data obtained by the full valuators. It is thus possible to obtain more appropriate valuation data.

As has been described in the foregoing, with the personnel valuation program according to the invention, it is possible to make use of great quantity data of multisided valuation by a plurality of valuators and adjust the initial valuation data having such deviation trend as being excessively severe or excessively less severe and generate more appropriate valuation data by using reference data.

In addition, the provision, in a personal computer, of the means for setting a valuator's weight for multiplying the valuation data thereby in dependence on the post of a valuator or valuators in the valuator group who can do appropriate valuation, the valuation data by the valuator or valuators at a post that he/she or they can do appropriate valuation, is more greatly reflected on the summation of the full valuation data, and it is thus possible to obtain still more appropriate valuation data.

Furthermore, since the reference data valuators are selected for obtaining appropriate personnel valuation data and also since the setting of reference data by the reference data valuators is done with respect to the valuation data of the whole valuatee group about all the valuation items, it is possible to have valuation data by persons who can appropriately grasp and valuate all of the valuatee group as reference data.

What is claimed is:

1. A personnel valuation program embodied on a computer readable medium for use with a computer, the personal valuation program comprising
   a valuatee setting operation for setting a valuatee group of valuatees to be valuated as a subject of personnel valuation, a valuator group of valuators for performing valuation corresponding to the valuatee group and a valuation item group, as items of valuation;
   a reference valuator operation for setting one or more reference valuators from the valuators in the valuator group as at least one reference data valuator;
   an inputting operation for inputting valuation data of the valuatees by all the valuators in the valuator group including the at least one reference data valuator;
   an adjusting operation for adjusting the inputted valuation data, other than the at least one reference data valuator with mean data of the at least one reference data valuator and a standard deviation of the inputted valuation data by the at least one reference data valuator, whereby adjusted valuation data is generated, such that mean data of the adjusted valuation data is identical with the mean data of the at least one reference data valuator and a reference deviation of the adjusted valuation data is identical with the standard deviation of the inputted valuation data by the at least one reference data valuator;

a summing operation for summing up the inputted valuation data of the individual valuatees in the whole valuatee group on the basis of the adjusted valuation data; and a setting operation for setting weight data of valuators for weighting the inputted valuation data in dependence on posts of the valuators in the valuator group indicating an ability to do appropriate valuation.

2. The personnel valuation program according to claim 1, wherein the at least one reference data valuator is selected for obtaining appropriate personnel valuation data, and the adjusted valuation data with respect to the inputted valuation data of all of the valuatee group about all of the valuation items.

* * * * *